United States Patent
Morita (10) Patent No.: US 11,198,771 B2
(45) Date of Patent: Dec. 14, 2021

(54) METHOD FOR PRODUCING ANISOTROPIC CONDUCTIVE SHEET

(71) Applicant: FURUKAWA ELECTRIC CO., LTD., Tokyo (JP)

(72) Inventor: Minoru Morita, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/902,817

(22) Filed: Jun. 16, 2020

(65) Prior Publication Data

US 2020/0308354 A1    Oct. 1, 2020

Related U.S. Application Data (63) Continuation of application No. PCT/JP2019/041760, filed on Oct. 24, 2019.

(30) Foreign Application Priority Data

Mar. 26, 2019   (JP) .............................. JP2019-057618

(51) Int. Cl.
  *C08J 5/18*   (2006.01)
  *C08K 3/04*   (2006.01)
  (Continued)

(52) U.S. Cl.
  CPC .................. *C08J 5/18* (2013.01); *C08K 3/041* (2017.05); *C08L 63/00* (2013.01);
  (Continued)

(58) Field of Classification Search
  CPC ........ H05K 3/365; C08J 5/18; C08L 2203/16; C08K 3/041
  (Continued)

(56) References Cited

U.S. PATENT DOCUMENTS 9,102,851 B2    8/2015   Lee et al.
2012/0145315 A1   6/2012   Knaapila et al.
(Continued)

FOREIGN PATENT DOCUMENTS

CN   101416309 A   4/2009
CN   101918770 A   12/2010
(Continued)

OTHER PUBLICATIONS

International Search Report dated Dec. 3, 2019 in PCT/JP2019/041760 filed on Oct. 24, 2019 (with English Translation of Categories of Cited Documents), citing documents AA & AO-AR therein, 4 pages.
(Continued)

*Primary Examiner* — Khanh T Nguyen
(74) *Attorney, Agent, or Firm* — Oblon, McClelland, Maier & Neustadt, L.L.P.

(57) ABSTRACT

A method for producing an anisotropic conductive sheet that can be used for an inspection of a semiconductor package or a high-frequency component part, in which the pitch of wiring is narrowed and the wiring itself has been subjected to wire thinning, and that can be easily produced. A method for producing an anisotropic conductive sheet, includes a molding step of molding a conductive filler material-containing composition including (A) a conductive filler material dispersed in an organic solvent and (B) a binder resin, into a sheet-like body, and an organic solvent volatilization step of heating one surface of the sheet-like body and thereby volatilizing the organic solvent through the other surface of the sheet-like body.

4 Claims, 1 Drawing Sheet

(51) Int. Cl.
*C08L 63/00* (2006.01)
*C08K 7/06* (2006.01)
*B29K 507/04* (2006.01)
*B29K 63/00* (2006.01)

(52) U.S. Cl.
CPC ...... *B29K 2063/00* (2013.01); *B29K 2507/04* (2013.01); *C08J 2363/00* (2013.01); *C08K 7/06* (2013.01); *C08K 2201/001* (2013.01); *C08K 2201/004* (2013.01); *C08L 2201/56* (2013.01); *C08L 2203/16* (2013.01)

(58) Field of Classification Search
USPC .......................................................... 252/511
See application file for complete search history.

(56) References Cited

U.S. PATENT DOCUMENTS

| | | | |
|---|---|---|---|
| 2013/0222975 A1 | 8/2013 | Yan et al. | |
| 2015/0187456 A1* | 7/2015 | Ji | H05K 3/365 |
| | | | 252/511 |
| 2016/0060490 A1* | 3/2016 | Uchida | C09D 133/068 |
| | | | 428/414 |

FOREIGN PATENT DOCUMENTS

| | | | |
|---|---|---|---|
| CN | 106905865 A | 6/2017 | |
| JP | 10-21740 A | 1/1998 | |
| JP | 2005-116291 A | 4/2005 | |
| JP | 2005-149764 A | 6/2005 | |
| JP | 2006-159569 A | 6/2006 | |
| JP | 2009-076431 A | 4/2009 | |
| JP | 5018612 B2 | 9/2012 | |
| JP | 6026321 B2 | 11/2016 | |

OTHER PUBLICATIONS

Combined Taiwanese Office Action and Search Report dated May 11, 2021 in Taiwanese Patent Application No. 109104324 (with English translation), citing documents AA, AO and AP therein, 11 pages.

Office Action dated Jul. 13, 2021 for the corresponding Singapore patent application No. 11202005226V.

Combined Chinese Office Action and Search Report dated Jun. 3, 2021 in corresponding Chinese Patent Application No. 201980007868.5 (with English Translation and English Translation of Category of Cited Documents), 15 pages.

* cited by examiner

METHOD FOR PRODUCING ANISOTROPIC CONDUCTIVE SHEET

TECHNICAL FIELD

The present invention relates to a method for producing an anisotropic conductive sheet that is electrically connected to, for example, an electrode to be inspected of a circuit device and is used for performing a conduction inspection of the electrode to be inspected.

BACKGROUND ART

Conventionally, in order to check normal conduction of wirings in semiconductor packages, high-frequency component parts, and the like, electrical connectors called contact probes have been used. In recent years, size reduction of contact probes has been promoted along with pitch narrowing of the wirings and wire thinning of the wirings themselves. However, contact probes are precision machine component parts containing springs, thin metallic tubes, and the like, and there are limitations on the size reduction thereof. Therefore, anisotropic conductive sheets are used as electrical connectors that can substitute for contact probes.

Regarding such an anisotropic conductive sheet, there is known an anisotropic conductive sheet produced by laminating core sheets, on each of which a plurality of metal wires are disposed to be aligned in one direction parallel to a plane of a sheet-like member formed from an elastic insulation member, and cutting the laminate in a direction approximately orthogonally intersecting the length direction of the metal wires (see, for example, Patent Document 1). Furthermore, there is also known an anisotropic conductive sheet produced by providing a plurality of through-holes growing in the thickness direction of a sheet of an insulating polymer elastomer, filling the through-holes with an elastic polymer substance containing an electrically conductive material, and rearranging the electrically conductive material by means of the action of a magnetic field (see, for example, Patent Document 2).

CITATION LIST

Patent Document

Patent Document 1: JP 6026321 B2
Patent Document 2: JP 5018612 B2

SUMMARY OF THE INVENTION

Problem to be Solved by the Invention

However, with regard to the anisotropic conductive sheet described in the Patent Document 1, it is necessary to make the metal wires also thinner along with the pitch narrowing of the wirings in semiconductor packages, high-frequency component parts, and the like and wire thinning of the wirings themselves, and it is also necessary to dispose the metal wires at a narrow pitch. Therefore, when metal wires are disposed at a constant interval on a sheet-like member formed from an elastic insulation member, there has been a problem that the metal wires break, or adjacent metal wires come into contact.

Furthermore, in the anisotropic conductive sheet described in Patent Document 2, since the width (diameter) of the through-holes that are filled with an elastic polymer substance containing an electrically conductive material becomes small concomitantly with pitch narrowing of wirings in semiconductor packages, high-frequency component parts, and the like and wire thinning of the wirings themselves, it is necessary to use small conductive particles having their particle sizes aligned, as the electrically conductive material. As a result, aggregates of the conductive particles are easily generated, and there is a problem that it is more difficult to fill the through-holes with the electrically conductive material. Furthermore, it is necessary to rearrange the conductive particles by subjecting the conductive particles to a magnetic field, and there is a problem that time and effort is taken for the production of an anisotropic conductive sheet.

Thus, it is an object of the present invention to provide a method for producing an anisotropic conductive sheet that can be used for an inspection of a semiconductor package or a high-frequency component part, in which the pitch of wiring is narrowed and the wiring itself has been subjected to wire thinning, and that can be easily produced, and an anisotropic conductive sheet.

Means for Solving Problem

In order to solve the problems described above, the method for producing an anisotropic conductive sheet according to the present invention includes: a molding step of molding a conductive filler material-containing composition including (A) a conductive filler material dispersed in an organic solvent and (B) a binder resin, into a sheet-like body; and an organic solvent volatilization step of heating one surface of the sheet-like body and thereby volatilizing the organic solvent through the other surface of the sheet-like body.

With regard to the method for producing an anisotropic conductive sheet, it is preferable that the conductive filler material is carbon nanotubes having a G/D band ratio obtained by Raman spectroscopy of 1.0 or higher and an average length of 1.0 μm or more.

With regard to the method for producing an anisotropic conductive sheet, it is preferable that the (B) binder resin is an epoxy resin, the conductive filler material dispersed in the (A) organic solvent is carbon nanotubes dispersed in an organic solvent, the conductive filler material-containing composition includes the carbon nanotubes dispersed in an organic solvent, the epoxy resin, and an epoxy resin curing agent, and the content of the carbon nanotubes is 0.1% to 15% by mass with respect to all solid components included in the conductive filler material-containing composition.

With regard to the method for producing an anisotropic conductive sheet, it is preferable that the resistance value in the thickness direction of the anisotropic conductive sheet is 2.0 Ω or less.

With regard to the method for producing an anisotropic conductive sheet, it is preferable that the thickness of the anisotropic conductive sheet is 1 to 500 μm.

In order to solve the problems described above, the anisotropic conductive sheet according to the present invention includes (A) a conductive filler material and (B) a binder resin, the resistance value in the thickness direction is 2.0 Ω or less, and the resistance value in a planar direction is 2.5 Ω or more.

With regard to the anisotropic conductive sheet, it is preferable that the (A) conductive filler material is carbon nanotubes having a G/D band ratio obtained by Raman spectroscopy of 1.0 or higher and an average length of 1.0 μm or more.

With regard to the anisotropic conductive sheet, it is preferable that the content of the carbon nanotubes is 0.1% to 15% by mass with respect to all solid components included in the anisotropic conductive sheet.

With regard to the anisotropic conductive sheet, it is preferable that the (B) binder resin is an epoxy resin.

Effect of the Invention

According to the present invention, a method for producing an anisotropic conductive sheet that can be used for an inspection of a semiconductor package or a high-frequency component part, in which the pitch of wiring is narrowed and the wiring itself has also been subjected to wire thinning, and that can be easily produced, can be provided.

MODE(S) FOR CARRYING OUT THE INVENTION

In the following description, the method for producing an anisotropic conductive sheet 1 according to the present embodiment will be described. The method for producing an anisotropic conductive sheet 1 according to the present embodiment includes a composition casting step of pouring a conductive filler material-containing composition including (A) a conductive filler material dispersed in an organic solvent and (B) a binder resin on a plate and molding the composition into a sheet shape, and an organic solvent volatilization step of volatilizing the organic solvent by heating the plate. Furthermore, if necessary, the method may have a curing step of curing the binder resin, after the organic solvent volatilization step. A detailed description will be given below.

<Preparation Step>

First, a conductive filler material-containing composition is prepared. The conductive filler material-containing composition is configured to include at least (A) a conductive filler material dispersed in an organic solvent, and (B) a binder resin. Hereinafter, the respective materials will be described.

[(A) Conductive Filler Material Dispersed in Organic Solvent]

The conductive filler material is not particularly limited as long as the effect of the present invention is not impaired; however, example include metal particles or metal fillers of a simple substance or a mixture of two or more kinds, carbon black, carbon nanotubes, carbon fillers, coated particles or coated fillers obtained by coating an inorganic or organic material with a conductive substance, and mixtures of a plurality of kinds of these. It is particularly preferable to use carbon nanotubes.

As the carbon nanotubes, any known carbon nanotubes can be used, and there are no particular limitations; however, single-layer carbon nanotubes obtained by winding one sheet plane of graphite into one layer, multilayer carbon nanotubes obtained by winding one sheet plane into a multilayer, and the like can be used. Furthermore, it is also acceptable to use single-layer carbon nanotubes and multi- layer carbon nanotubes in combination. In the present invention, from the viewpoints of electrical conductivity and mechanical characteristics, it is particularly preferable that (i) long single-layer carbon nanotubes having a small diameter (fiber diameter) and a large aspect ratio are used alone, or (ii) a mixture of single-layer carbon nanotubes and multilayer carbon nanotubes is used. Furthermore, the shape (average length, fiber diameter, and aspect ratio) of the various carbon nanotubes is also not particularly limited, and the shape may be selected as appropriate by comprehensively judging the electrical conductivity, flexibility, durability, and the like required from a conductor.

In a case in which (i) long single-layer carbon nanotubes having a small diameter and a large aspect ratio are used alone, the lower limit of the average length of the single-layer carbon nanotubes is preferably 1.0 µm, more preferably 5.0 µm, and particularly preferably 10 µm, from the viewpoint of further enhancing the electrical conductivity. On the other hand, the upper limit of the average length of the single-layer carbon nanotubes is preferably 200 µm, more preferably 150 µm, and particularly preferably 100 µm, from the viewpoint of preventing deterioration of the surface external appearance when the composition is produced into a molded product or a film. The lower limit of the diameter of the single-layer carbon nanotubes is preferably 0.5 nm, and particularly preferably 1.0 nm, from the viewpoint of suppressing aggregation when the single-layer carbon nanotubes are dispersed in a thermosetting resin and an organic solvent. On the other hand, the upper limit of the diameter of the single-layer carbon nanotubes is preferably 15 nm, and particularly preferably 10 nm, from the viewpoint of enhancing the mechanical characteristics by a nano effect.

Furthermore, the aspect ratio of the single-layer carbon nanotubes is preferably 100 or higher, more preferably 1,000 or higher, even more preferably 10,000 or higher, and particularly preferably 30,000 or higher. It is because in a case in which long carbon nanotubes are used, electrical conductivity is secured with a small number of electrical contacts compared to the case of using short carbon nanotubes, and since the number of electrical contacts with other carbon nanotubes in one carbon nanotube becomes larger, a higher-dimensional electrical network can be formed, while conductive paths are not easily cut off even if the anisotropic conductive sheet 1 is deformed.

Regarding the single-layer carbon nanotubes, it is preferable that the carbon purity is 99% by weight or higher. It is because in a case in which carbon nanotubes containing a large amount of impurities are used, electrical conductivity of the anisotropic conductive sheet 1 may be decreased.

In a case in which (ii) a mixture of single-layer carbon nanotubes and multilayer carbon nanotubes is used, the volume resistivity can be suppressed to a lower level compared to the case of using single-layer carbon nanotubes alone. As the single-layer carbon nanotubes, the above-described long single-layer carbon nanotubes are preferred. On the other hand, the multilayer carbon nanotubes may be two-layer carbon nanotubes (DWNT) or may be multilayer carbon nanotubes (MWNT) having three or more layers (in the present specification, both will be collectively referred to simply as multilayer carbon nanotubes).

The fiber diameter of the multilayer carbon nanotubes is preferably 5 to 15 nm. When the fiber diameter is less than 5 nm, dispersion of the multilayer carbon nanotubes is poor, and as a result, the conductive paths do not spread, while the electrical conductivity may become insufficient. On the other hand, when the fiber diameter is more than 15 nm, the number of carbon nanotubes becomes small even at the same weight, and thus the conductivity may become insufficient. Furthermore, the aspect ratio of the multilayer carbon nanotubes is preferably 50 to 2,000.

With regard to the mixture of single-layer carbon nanotubes and multilayer carbon nanotubes, the content of the single-layer carbon nanotubes with respect to the total amount of the single-layer carbon nanotubes and the multilayer carbon nanotubes is preferably 20% to 70% by mass. In a case in which the content of the single-layer carbon nanotubes is less than 20% by mass, the volume resistivity may fluctuate significantly when the anisotropic conductive sheet 1 is deformed. On the other hand, when the content of the single-layer carbon nanotubes is more than 70% by mass, the effect of reducing the volume resistivity cannot be sufficiently enjoyed. The content of the single-layer carbon nanotubes is more preferably 30% to 70% by mass.

The carbon nanotubes are preferably such that the G/D band ratio obtained by Raman spectroscopy is 1.0 or higher. A Raman shift appearing in the vicinity of 1,590 $cm^{-1}$ in a Raman spectrum is called G-band originating from graphite, and a Raman shift appearing in the vicinity of 1,350 $cm^{-1}$ is called D-band originating from defects in amorphous carbon or graphite. That is, as the carbon nanotubes have a higher G/D ratio, which is the ratio of peak heights of the G-band and the D-band, the carbon nanotubes have high linearity, a high degree of crystallization, and high product quality. Furthermore, in Raman spectroscopy for solid, measured values may vary depending on sampling. Thus, it should be noted that Raman spectroscopy is performed at at least three different places, and an arithmetic mean thereof is adopted.

Regarding the carbon nanotubes, the BET specific surface area is preferably 600 $m^2/g$ or greater. When the BET specific surface area is 600 $m^2/g$ or greater, the electrical conductivity, thermal conductivity, and strength of a conduction path 4 can be sufficiently increased. Meanwhile, in the present invention, the "BET specific surface area" refers to a nitrogen adsorption specific surface area measured using a BET method.

The carbon nanotubes should be dispersed in an organic solvent. Examples of the organic solvent include alcohol-based solvents such as methanol, ethanol, isopropanol, butanol, methoxyethoxyethanol, butoxyethanol, butyl carbitol, hexyloxyethanol, octanol, 1-methoxy-2-propanol, and ethylene glycol; aliphatic halogen-based solvents such as chloroform; aprotic polar solvents such as N,N-dimethylformamide (DMF), N,N-dimethylacetamide, N-methyl-2-pyrrolidone (NMP), N-ethyl-2-pyrrolidone, and dimethyl sulfoxide (DMSO); aromatic solvents such as chlorobenzene, dichlorobenzene, trichlorobenzene, benzene, toluene, ethylbenzene, xylene, mesitylene, tetralin, tetramethylbenzene, anisole, thioanisole, fluorobenzene, trifluoromethylbenzene, pyridine, and quinoline; ketone-based solvents such as cyclohexanone, acetone, methyl ethyl ketone, methyl isobutyl ketone, diethyl ketone, isophorone, and acetophenone; ether-based solvents such as diethyl ether, tetrahydrofuran (THF), t-butyl methyl ether, diisopropyl ether, dimethoxyethane, dioxane, and diglyme; ester solvents such as methyl acetate, ethyl acetate, butyl acetate, and diacetoxypropane; propylene glycol 1-monomethyl ether 2-acetate. The organic solvents can be used singly or in combination of two or more kinds thereof.

Mixing of the carbon nanotubes and the organic solvent is not particularly limited; however, mixing can be carried out using an apparatus that can implement methods such as a homogenizer, thin film revolution, a jaw crusher, an automatic mortar, ultracentrifugal pulverization, a jet mill, a cutting mill, a disk mill, a ball mill, rotation-revolution agitation, and ultrasonic dispersing. Among these mixing methods, from the viewpoint that control of the bundle diameter is made easy, and from the viewpoint that defects generated in the carbon nanotubes can be reduced, it is preferable that mixing is carried out using a homogenizer or a jet mill, and it is more preferable to use a homogenizer. Furthermore, if necessary, two or more of these methods may be used in combination.

The content of the carbon nanotubes is preferably 0.001% to 50% by mass, more preferably 0.01% to 25% by mass, and even more preferably 0.01% to 10% by mass, with respect to the organic solvent. When the content is in this range, dispersibility and orientation of the carbon nanotubes in the anisotropic conductive sheet 1 are enhanced.

[(B) Binder Resin]

Regarding the binder resin, it is preferable to use a thermosetting resin, or a thermosetting resin and a thermoplastic resin, and it is also preferable to use a radiation-curable resin.

Examples of the thermosetting resin include an epoxy resin, a phenol resin, as well as an amino resin, an unsaturated polyester resin, a polyurethane resin, a silicone resin, and a thermosetting polyimide resin. The thermosetting resins can be used singly or in combination of two or more kinds thereof. As the thermosetting resin, particularly an epoxy resin is suitable.

The epoxy resin is not particularly limited, and for example, bifunctional epoxy resins and polyfunctional epoxy resins, such as a bisphenol A type epoxy resin, a bisphenol F type epoxy resin, a bisphenol S type epoxy resin, a brominated bisphenol A type epoxy resin, a hydrogenated bisphenol A type epoxy resin, a bisphenol AF type epoxy resin, a biphenyl type epoxy resin, a naphthalene type epoxy resin, a fluorene type epoxy resin, a phenol novolac type epoxy resin, an ortho-cresol novolac type epoxy resin, a trishydroxyphenylmethane type epoxy resin, and a tetraphenylolethane type epoxy resin; or epoxy resins such as a hydantoin type epoxy resin, a trisglycidyl isocyanurate type epoxy resin, or a glycidylamine type epoxy resin, can be used.

In a case in which an epoxy resin is used as the thermosetting resin, an epoxy resin curing agent can be used. Known curing agents such as amines, acid anhydrides, and polyvalent phenols can be used; however, the curing agent is preferably a potential curing agent that exhibits curability at a predetermined temperature higher than or equal to normal temperature and even exhibits rapid curability. As the potential curing agent, dicyandiamide, an imidazole, a hydrazide, a boron trifluoride-amine complex, an amineimide, a polyamine salt and modification products thereof, and a microcapsule type curing agent can also be used. These can be used singly or as mixtures of two or more kinds thereof. The amount of use of the epoxy resin curing agent is usually in the range of 0.5% to 50% by mass with respect to the epoxy resin.

Examples of the thermoplastic resin include natural rubber, butyl rubber, isoprene rubber, chloroprene rubber, an ethylene-vinyl acetate copolymer, an ethylene-acrylic acid copolymer, an ethylene-acrylic acid ester copolymer, a polybutadiene resin, a polycarbonate resin, a thermoplastic polyimide resin, a polyamide resin such as 6-nylon or 6,6-nylon, a phenoxy resin, an acrylic resin, a saturated polyester resin such as polyethylene terephthalate (PET) or polybutylene terephthalate (PBT), a polyamideimide resin, and a fluororesin. The thermoplastic resins can be used singly or in combination of two or more kinds thereof. Among these thermoplastic resins, an acrylic resin is preferred from the viewpoint of having fewer ionic impurities and excellent stress relaxation properties. Furthermore, from the viewpoint of achieving a balance between flexibility and strength and having high toughness, a phenoxy resin is preferred.

The acrylic resin is not particularly limited, and the acrylic resin may be a polymer containing one kind or two or more kinds of esters of acrylic acid or methacrylic acid, which has a linear or branched alkyl group having 30 or fewer carbon atoms (preferably 1 to 12 carbon atoms, more preferably 6 to 10 carbon atoms, and particularly preferably 8 or 9 carbon atoms), as components. That is, in the present invention, the term acrylic resin means a methacrylic resin in a broad sense. Examples of the alkyl group include a methyl group, an ethyl group, a propyl group, an isopropyl group, an n-butyl group, a t-butyl group, an isobutyl group, a pentyl group, an isopentyl group, a hexyl group, a heptyl group, a 2-ethylhexyl group, an octyl group, an isooctyl group, a nonyl group, an isononyl group, a decyl group, an isodecyl group, an undecyl group, a dodecyl group (lauryl group), a tridecyl group, a tetradecyl group, a stearyl group, and an octadecyl group.

Furthermore, the other monomer for forming the acrylic resin (monomer other than an alkyl ester of acrylic acid or methacrylic acid, in which the carbon number of the alkyl group is 30 or less) is not particularly limited, and examples include a carboxyl group-containing monomer such as acrylic acid, methacrylic acid, carboxyethyl acrylate, carboxypentyl acrylate, itaconic acid, maleic acid, fumaric acid, or crotonic acid; an acid anhydride monomer such as maleic anhydride or itaconic anhydride; a hydroxyl group-containing monomer such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, or (4-hydroxymethylcyclohexyl) methacrylate; a sulfonic acid group-containing monomer such as styrenesulfonic acid, allylsulfonic acid, 2-(meth)acrylamido-2-methylpropane sulfonic acid, (meth)acrylamidopropane sulfonic acid, sulfopropyl (meth)acrylate, or (meth)acryloyloxynaphthalene sulfonic acid; and a phosphoric acid group-containing monomer such as 2-hydroxyethyl acryloyl phosphate. Furthermore, (meth)acrylic acid means acrylic acid and/or methacrylic acid, and the term (meth) of the present invention means the same in all cases.

An example of the radiation-curable resin may be an addition type radiation-curable resin obtained by formulating a radiation-curable monomer component or a radiation-curable oligomer component; however, above all, an acrylic radiation-curable resin is preferred.

Examples of the acrylic radiation-curable resin include acrylic polymers that use one kind or two or more kinds of (meth)acrylic acid alkyl esters (for example, linear or branched alkyl esters having an alkyl group having 1 to 30 carbon atoms, and particularly 4 to 18 carbon atoms, such as methyl ester, ethyl ester, propyl ester, isopropyl ester, butyl ester, isobutyl ester, s-butyl ester, t-butyl ester, pentyl ester, isopentyl ester, hexyl ester, heptyl ester, octyl ester, 2-ethylhexyl ester, isooctyl ester, nonyl ester, decyl ester, isodecyl ester, undecyl ester, dodecyl ester, tridecyl ester, tetradecyl ester, hexadecyl ester, octadecyl ester, and eicosyl ester) and (meth)acrylic acid cycloalkyl esters (for example, cyclopentyl ester and cyclohexyl ester) as monomer components. Furthermore, (meth)acrylic acid ester means acrylic acid ester and/or methacrylic acid ester, and the term (meth) of the present invention means the same in all cases.

The acrylic radiation-curable resin may include a unit corresponding to another monomer component capable of being copolymerized with the (meth)acrylic acid alkyl ester or cycloalkyl ester as necessary, for the purpose of modifying the cohesive power, heat resistance, and the like. Examples of such a monomer component include carboxyl group-containing monomers such as acrylic acid, methacrylic acid, carboxyethyl (meth)acrylate, carboxypentyl (meth)acrylate, itaconic acid, maleic acid, fumaric acid, and crotonic acid; acid anhydride monomers such as maleic anhydride and itaconic anhydride; hydroxyl group-containing monomers such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, and (4-hydroxymethylcyclohexyl)methyl (meth)acrylate; sulfonic acid group-containing monomers such as styrenesulfonic acid, allylsulfonic acid, 2-(meth)acrylamido-2-methylpropane sulfonic acid, (meth)acrylamidopropane sulfonic acid, sulfopropyl (meth)acrylate, (meth)acryloyloxynaphthalene sulfonic acid; phosphoric acid group-containing monomers such as 2-hydroxyethylacryloyl phosphate; acrylamide, and acrylonitrile. These copolymerizable monomer components can be used singly or in combination of two or more kinds thereof. The amount of use of these copolymerizable monomers is preferably 40% by weight or less of all the monomer components.

Furthermore, the acrylic radiation-curable resin can also include a polyfunctional monomer or the like as a monomer component for copolymerization as necessary, in order to be crosslinked. Examples of such a polyfunctional monomer include hexanediol di(meth)acrylate, (poly)ethylene glycol di(meth)acrylate, (poly)propylene glycol di(meth)acrylate, neopentyl glycol di(meth)acrylate, pentaerythritol di(meth)acrylate, trimethylolpropane tri(meth)acrylate, pentaerythritol tri(meth)acrylate, dipentaerythritol hexa(meth)acrylate, epoxy (meth)acrylate, polyester (meth)acrylate, and urethane (meth)acrylate. These polyfunctional monomers can also be used singly or in combination of two or more kinds thereof. The amount of use of the polyfunctional monomer is preferably 30% by mass or less of all the monomer components.

In a case in which the acrylic radiation-curable resin is cured by ultraviolet radiation or the like, it is preferable to incorporate a photopolymerization initiator into the acrylic radiation-curable resin.

[Other Components]

It is preferable that the conductive filler material-containing composition includes a dispersant. The dispersant is not particularly limited as long as the dispersant has a function of dispersing carbon nanotubes; however, a silane coupling agent is suitably used. Furthermore, it is also possible to use a dispersant having a functional group that adsorbs to carbon nanotubes (for example, an alkyl group; an aromatic group such as pyrene, anthracene, terphenylene, or porphyrin; or an alicyclic group such as cholesterol), a steric repulsive group suppressing the aggregation of carbon nanotubes (a linear or branched alkyl group, a polymer-derived group such as a polyacrylic acid ester, or the like), or an electrostatic repulsion group (for example, a salt of a carboxyl group, a sulfonic acid group, or a phosphoric acid group; or an ammonium group), can also be used; however, above all, it is preferable to use a surfactant.

The silane coupling agent is not particularly limited as long as it is a compound having a hydrolyzable silyl group or silanol group and a functional group. The hydrolyzable silyl group that a silane coupling agent has may be, for example, an alkoxysilyl group. The number of carbon atoms of the alkoxy group carried by the alkoxysilyl group can be adjusted to 1 to 5. The number of alkoxy groups to be bonded to one silicon atom is preferably 2 or 3. In a case in which the number of alkoxy groups to be bonded to one silicon atom is 2 or less, there are no particular limitations on the hydrocarbon group that can be bonded to a silicon atom. For example, an alkyl group may be used.

Examples of the functional group that a silane coupling agent has include an epoxy group, an amino group, an imino group (—NH—), and a hydroxy group. Above all, an epoxy group is preferred. A hydrolyzable silyl group or silanol group and a functional group can be bonded by a hydrocarbon group that may have a heteroatom. The heteroatom and the hydrocarbon group have the same meanings as described above.

The silane coupling agent is preferably an epoxysilane or an aminosilane. The epoxysilane is more preferably a glycidyloxyalkyltrialkoxysilane or a glycidyloxyalkyldialkoxyalkylsilane, and 3-glycidyloxypropyltrimethoxysilane may be mentioned. The aminosilane can have an amino group and/or an imino group. An aminosilane having an imino group may be mentioned as one preferred embodiment. Examples of the aminosilane having an imino group include N-phenyl-3-aminopropyltrimethoxysilane, N-2-(aminoethyl)-3-aminopropylmethyldimethoxysilane, and N-2-(aminoethyl)-3-aminopropyltrimethoxysilane.

The silane coupling agents can be used singly or in combination of two or more kinds thereof.

The content of the dispersant is preferably 0.1 to 100 times, more preferably 1 to 10 times, and particularly preferably 1 to 5 times, with respect to the weight of the carbon nanotubes.

In the conductive filler material-containing composition described above, particularly, carbon nanotubes dispersed in an organic solvent, an epoxy resin, an epoxy resin curing agent are included, and the content of carbon nanotubes with respect to all the solid components in the conductive filler material-containing composition is preferably 0.1% to 15% by mass. When the content is smaller than 0.1% by mass, the resistance value in the thickness direction of the sheet becomes large, while when the content is 15% by mass or more, the brittleness of the sheet becomes strong, and the handleability at the time of handling the anisotropic conductive sheet becomes poor. Here, the solid components are components excluding volatile components such as an organic solvent, which are included in the conductive filler material-containing composition, and carbon nanotubes are also included therein.

In the conductive filler material-containing composition, other additives can be appropriately incorporated as necessary. Examples of the other additives include other electrically conductive fillers (fillers), a flame retardant, an ion trapping agent, as well as a thickener, an aging inhibitor, an oxidation inhibitor, and a surfactant.

Regarding the anisotropic conductive sheet 1, it is preferable that the resistance value in the thickness direction is 2.0 Ω or less, and the resistance value in the planar direction is 2.5 Ω or more, in order to make it easy to attain electrical conduction between a semiconductor package and a circuit board for inspection in a case in which an anisotropic conductive sheet is provided between a semiconductor package and a circuit board for inspection, and a test is carried out. Regarding the conductive filler material-containing composition, it is preferable to adjust the resistance value in the thickness direction of the anisotropic conductive sheet 1 after drying and curing to be 2.0 Ω or less, and the resistance value in the planar direction to be 2.5 Ω or more. Furthermore, it is preferable for the anisotropic conductive sheet 1 that the content of the carbon nanotubes is 0.1% to 15% by mass with respect to all the solid components included in the anisotropic conductive sheet 1.

<Composition Casting Step>

Next, a composition casting step of pouring a conductive filler material-containing composition on a plate and molding the composition into a sheet form is carried out. The composition casting step is not limited as long as the conductive filler material-containing composition can be molded into a desired sheet form; however, a method of using a plate and casting the conductive filler material-containing composition into a space surrounded by the plate and a molding flask is preferred. The molding flask may be a mold formed into a casing form by providing a through-hole from the top face to the bottom face of a plate-shaped member, or a mold having four rod-shaped members disposed so as to provide weirs on four sides on a substrate.

The size of the shaping die is determined according to the size of the anisotropic conductive sheet 1. The size of the anisotropic conductive sheet 1 can be appropriately changed according to the size or the like of the circuit device 2 as an object of inspection, and there are no particular limitations. The thickness of the size of the anisotropic conductive sheet 1 is also not particularly limited; however, the thickness is preferably 1 to 500 μm, more preferably 50 to 500 μm, and particularly preferably 150 to 300 μm. When the sheet thickness is less than this range, bending is prone to occur in the anisotropic conductive sheet, and in a case in which an anisotropic conductive sheet is provided between a semiconductor package and a circuit board for inspection, and a test is carried out, it becomes difficult to attain electrical conduction. On the other hand, when the sheet thickness becomes a thickness more than or equal to this range, it is difficult to attain connection between the conductive filler materials, and the resistance value in the thickness direction increases.

Meanwhile, according to the present embodiment, a composition casting step of pouring a conductive filler material-containing composition on a plate and molding the composition into a sheet form is employed; however, any molding process of molding a conductive filler material-containing composition into a sheet-like body is acceptable, and the process is not limited to the composition casting step. Here, the sheet-like body means a body having a form spread into a planar form, having a size of 1×1 mm or more in the planar direction, and having a thickness that is 1/10 or less of the dimension in the planar direction. The dimension in the planar direction is the length of a short side of a rectangle when a rectangle having the smallest area circumscribing the sheet-like body is drawn. The sheet-like body may be liquid, irrespective of the nature, as long as the shape spread in a planar form is maintained.

<Organic Solvent Volatilization Step>

Next, an organic solvent volatilization step of heating the plate and thereby volatilizing the organic solvent in the conductive filler material-containing composition that has been cast in the composition casting step, is carried out. The organic solvent volatilization step is carried out by heating depending on the type of the organic solvent, usually at 70° C. to 250° C. for 1 to 60 minutes. By heating the plate on which the conductive filler material-containing composition is cast, the conductive filler material-containing composition is heated through a single side in the thickness direction. At this time, since the opposite side of the plate side of the conductive filler material-containing composition is released, a flow of the organic solvent volatilizing occurs from the heated side toward the side that is not heated. The conductive filler material migrates along this flow and is oriented in the thickness direction of the conductive filler material-containing composition. Meanwhile, in the description given above, it was suggested to heat the plate on which the conductive filler material-containing composition is cast; however, any method may be used as long as one surface of a sheet-like body of the conductive filler material-containing composition is heated, and thereby the organic solvent is volatilized through the other surface of the sheet-like body.

<Curing Step>

Next, in a case in which the conductive filler material-containing composition includes a thermosetting resin as a binder resin, the conductive filler material-containing composition is cured by heating according to the type of the curing agent and the curing catalyst, and thus an anisotropic conductive sheet 1 is formed. Heating is usually carried out at 70° C. to 250° C., and for example, in the case of an epoxy resin that is used as a liquid amine-based curing agent, heating is carried out at 50° C. to 1,500° C. for 1 to 60 minutes. Meanwhile, in a case in which the conductive filler material-containing composition includes a thermosetting resin as a binder resin, it is preferable to implement the organic solvent volatilization step and a curing step simultaneously. In a case in which the conductive filler material-containing composition includes a radiation-curable resin as a binder resin, it is preferable to implement the organic solvent volatilization step and an ultraviolet curing step simultaneously. In this case, usually 200 mJ/cm$^2$ to 1,000 mJ/cm$^2$, and more preferably 400 mJ/cm$^2$ to 750 mJ/cm$^2$, of radiation is radiated to cure the conductive filler material-containing composition, and thus the anisotropic conductive sheet 1 is formed.

In this manner as described above, the anisotropic conductive sheet 1 is obtained. According to the present invention, since the conductive filler material is oriented by means of the flow of the organic solvent volatilizing in the organic solvent volatilization step, there is no need to rearrange the conductive filler material by causing a magnetic field to act, and anisotropic conductive sheet can be produced easily.

Next, a method of using the anisotropic conductive sheet 1 of the present embodiment will be described with reference to FIG. 1. The anisotropic conductive sheet 1 of the present invention is used for a conduction inspection of an electrode to be inspected 3 in a circuit device 2 as an object of inspection.

Figure 1:
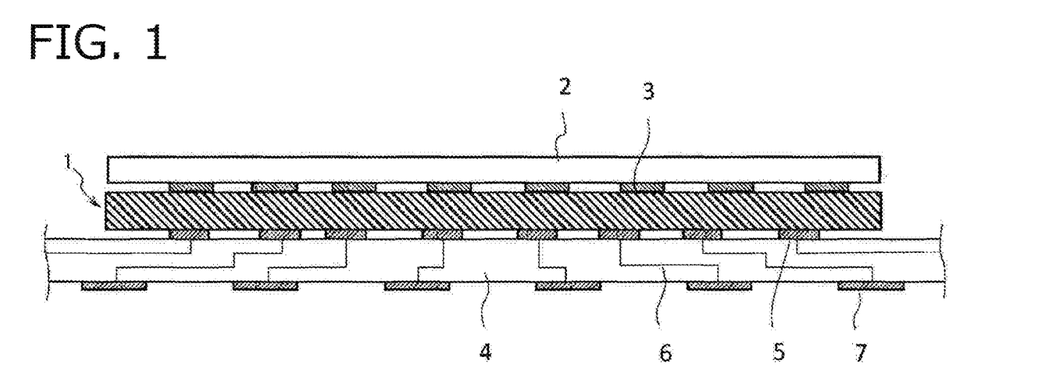
FIG. 1 is a cross-sectional view for schematically describing a method of using the anisotropic conductive sheet according to an embodiment of the present invention.

Specifically, as illustrated in FIG. 1, a circuit board for inspection 4 is used in order to perform a conduction inspection. An example of the circuit board for inspection 4 is illustrated. On a first surface of this circuit board for inspection 4, a large number of electrodes for connection 5 are provided correspondingly to electrodes to be inspected 3 in a circuit device 2 as an object of inspection. Furthermore, on a second surface of the circuit board for inspection 4, a large number of terminal electrodes 7 that are electrically connected to electrodes for connection 5 via internal wiring 6 are formed. Then, the terminal electrodes 7 of this circuit board for inspection 4 are electrically connected to a tester (not illustrated in the diagram) by an appropriate means.

On the first surface of the circuit board for inspection 4, the anisotropic conductive sheet 1 of the present embodiment is disposed, and a circuit device 2 as an object of inspection is disposed on the anisotropic conductive sheet 1 such that electrodes to be inspected 3 of the circuit device 2 come into contact with the anisotropic conductive sheet 1. By applying pressure on the assembly in this state, electrical connection between the electrodes to be inspected 3 of the circuit device 2 as an object of inspection and the electrodes for connection 5 of the circuit board for inspection 4 is achieved via the conductive filler material which is oriented in the anisotropic conductive sheet 1, and thus necessary inspection is performed.

By using the anisotropic conductive sheet 1 according to the present embodiment, even if the pitch between electrodes to be inspected 3 of a circuit device 2 as an object of inspection is very small, and the electrodes to be inspected 3 form a fine and complicated pattern, necessary electrical connection can be achieved securely.

EXAMPLES

Next, in order to further clarify the effects of the present invention, Examples and Comparative Examples will be described in detail; however, the present invention is not intended to be limited to these Examples.

Example 1

<Preparation of Conductive Filler Material-Containing Composition>

9 parts by mass of a bisphenol A type epoxy resin (trade name: YD-128, manufactured by NSCC Epoxy Manufacturing Co., Ltd., mass average molecular weight: 400, softening point: 25° C. or lower, liquid, epoxy equivalent: 190) as a binder resin, 1 part by mass of diethylenetriamine (manufactured by Mitsui Fine Chemicals, Inc, purity: 99% or higher, specific gravity: 0.95) as an epoxy resin curing agent, and 177 parts by mass of single-layer carbon nanotubes (trade name: ZEONANO (registered trademark) 03DS-NP-RD, manufactured by Zeon Corporation, solid content 0.3% by mass, length 100 μm or more, G/D band ratio 5.0 or higher) dispersed in N-methyl-2-pyrrolidone as a conductive filler material dispersed in an organic solvent were weighed in a 250-ml plastic vessel (trade name: PACKACE P-250, manufactured by Teraoka Seiko Co., Ltd.), stirring was performed for 10 minutes in a planetary type agitation degassing apparatus (trade name: MAZERUSTAR KK-250, manufactured by KURABO INDUSTRIES LTD.), and thus a conductive filler material-containing composition was obtained.

<Production of Anisotropic Conductive Sheet>

An SUS304 mold (mold dimension 160×160 mm, hole dimension 40×40 mm, thickness 2 mm) was mounted on a SUS304 plate (dimension 160×160 mm), a conductive filler material-containing composition varnish was cast into the hole, and the mold was placed in a small-sized heat pressing machine (trade name: H300-10D, manufactured by AS ONE Corporation). Only the lower heating temperature was set to 180° C. (the upper heating temperature was set to be turned off), and the mold was heated for 30 minutes so as to volatilize the organic solvent through a coating film by a top-open system, while the coating film was thermally cured. A sheet obtained after drying and thermal curing was detached and taken out from the mold, and a sheet having a size of 40 mm×40 mm×100 μm was formed. Thereby, an anisotropic conductive sheet according to Example 1 was obtained.

Example 2

An anisotropic conductive sheet according to Example 2 was obtained in the same manner as in Example 1, except that in regard to the preparation of the conductive filler material-containing composition, 265 parts by mass of single-layer carbon nanotubes (trade name: EC1.5P-NMP, manufactured by MEIJO NANO CARBON Co., Ltd., solid content 0.2% by mass, length 5 to 10 µm, G/D band ratio 50 or higher) dispersed in N-methyl-2-pyrrolidone were used as the conductive filler material dispersed in an organic solvent.

Example 3

An anisotropic conductive sheet according to Example 3 was obtained in the same manner as in Example 1, except that in regard to the preparation of the conductive filler material-containing composition, 265 parts by mass of single-layer carbon nanotubes (trade name: EC2.0P-NMP, manufactured by MEIJO NANO CARBON Co., Ltd., solid content 0.2% by mass, length 10 to 15 µm, G/D band ratio 50 or higher) dispersed in N-methyl-2-pyrrolidone were used as the conductive filler material dispersed in an organic solvent.

Example 4

An anisotropic conductive sheet according to Example 4 was obtained in the same manner as in Example 1, except that in regard to the preparation of the conductive filler material-containing composition, 375 parts by mass of single-layer carbon nanotubes (trade name: EC2.0P-NMP, manufactured by MEIJO NANO CARBON Co., Ltd., solid content 0.2% by mass, length 10 to 15 µm, G/D band ratio 50 or higher) dispersed in N-methyl-2-pyrrolidone were used as the conductive filler material dispersed in an organic solvent.

Example 5

An anisotropic conductive sheet according to Example 5 was obtained in the same manner as in Example 1, except that in regard to the preparation of the conductive filler material-containing composition, 555 parts by mass of single-layer carbon nanotubes (trade name: EC2.0P-NMP, manufactured by MEIJO NANO CARBON Co., Ltd., solid content 0.2% by mass, length 10 to 15 µm, G/D band ratio 50 or higher) dispersed in N-methyl-2-pyrrolidone were used as the conductive filler material dispersed in an organic solvent.

Example 6

An anisotropic conductive sheet according to Example 6 was obtained in the same manner as in Example 2, except that in regard to the preparation of the conductive filler material-containing composition, 9 parts by mass of a hardly crystallizable liquid epoxy resin (trade name: ZX-1059, manufactured by NSCC Epoxy Manufacturing Co., Ltd., viscosity 2,250 mPa·s, softening point: 25° C. or lower, liquid, epoxy equivalent: 165) was used in place of the bisphenol A type epoxy resin.

Example 7

An anisotropic conductive sheet according to Example 7 was obtained in the same manner as in Example 2, except that in regard to the preparation of the conductive filler material-containing composition, 9 parts by mass of a cyclic aliphatic diglycidyl ether-based epoxy resin (trade name: ZX-1658GS, manufactured by NSCC Epoxy Manufacturing Co., Ltd., viscosity 50 mPa·s, softening point : 25° C. or lower, liquid, epoxy equivalent: 133) was used in place of the bisphenol A type epoxy resin.

Example 8

An anisotropic conductive sheet according to Example 8 was obtained in the same manner as in Example 2, except that in regard to the preparation of the conductive filler material-containing composition, 7 parts by mass of polydimethylsiloxane (trade name: XP1434, manufactured by JNC CORPORATION, viscosity 50 mPa·s, liquid) and 3 parts by mass of an alkoxyepoxysilane (trade name: S-510, manufactured by JNC CORPORATION, 3-glycidyloxypropyltrimethoxysilane) were used.

Example 9

An anisotropic conductive sheet according to Example 9 was obtained in the same manner as in Example 1, except that in regard to the preparation of the conductive filler material-containing composition, 500 parts by mass of single-layer carbon nanotubes (trade name: ZEONANO (registered trademark) 03DS-NP-RD, manufactured by Zeon Corporation, solid content 0.3% by mass, average length 100 µm or more, G/D band ratio 5.0 or higher) dispersed in N-methyl-2-pyrrolidone were used as the conductive filler material dispersed in an organic solvent.

Example 10

An anisotropic conductive sheet according to Example 10 was obtained in the same manner as in Example 2, except that in regard to the preparation of the conductive filler material-containing composition, 7 parts by mass of a polydimethylsiloxane having a silanol group (trade name: FM-9915, manufactured by JNC CORPORATION, viscosity 130 mPa·s, liquid), which is a silicone resin, was used in place of the bisphenol A type epoxy resin, and 3 parts by mass of an alkoxyepoxysilane (trade name: S-510, manufactured by JNC CORPORATION, 3-glycidyloxypropyltrimethoxysilane) was used in place of diethylenetriamine.

Comparative Example 1

An isotropic conductive sheet was obtained in the same manner as in Example 1, except that in regard to the production of the anisotropic conductive sheet, an SUS304 mold (mold dimension 160×160 mm, hole dimension 40×40 mm, thickness 2 mm) was mounted on a SUS304 plate (dimension 160×160 mm), the conductive filler material-containing composition varnish described in Example 1 was cast into the hole, the mold was placed in a small-sized heat pressing machine (trade name: H300-10D, manufactured by AS ONE Corporation), an SUS304 plate (dimension 160× 160 mm) was further overlapped from above to apply a pressing pressure of 0.1 MPa, the upper and lower side heating temperatures were set to 180° C., the assembly was heated for 30 minutes, and the organic solvent was volatilized from a coating film, while the coating film was thermally cured.

Comparative Example 2

An anisotropic conductive sheet was obtained in the same manner as in Example 1, except that in regard to the production of the anisotropic conductive sheet, the composition was applied on a polyimide film by a comma coater method to form a coating film, subsequently the coating film was heated for 30 minutes at 180° C., thereby the organic solvent was volatilized from the coating film, while the coating film was thermally cured, and thereby a thermally cured coating film having a thickness of 100 μm was formed.

Comparative Example 3

An anisotropic conductive sheet was obtained in the same manner as in Example 1, except that in regard to the preparation of the conductive filler material-containing composition, 0.53 part by mass of powdered type carbon nanotubes (trade name: ZEONANO (registered trademark) SG101, manufactured by Zeon Corporation, length 100 μm or more, G/D band ratio 5.0 or higher) were used in place of the conductive filler material dispersed in an organic solvent.

For the anisotropic conductive sheets according to Examples 1 to 10 and Comparative Examples 1 to 3, the following measurement and evaluation were carried out. The results are presented in Tables 1 and 2.

(Resistance Value in Thickness Direction)

The resistance values in the thickness direction of the anisotropic conductive sheets according to Examples 1 to 10 and Comparative Examples 1 to 3 were measured with a resistance meter (product No: RM3544, manufactured by HIOKI E.E. CORPORATION, measuring terminal: pin type lead L2103).

(Resistance Value in Planar Direction)

The resistance values in the planar direction of the anisotropic conductive sheets according to Examples 1 to 10 and Comparative Examples 1 to 3 were measured with a resistance meter (product No: RM3544, manufactured by HIOKI E.E. CORPORATION, measuring terminal: pin type lead L2103), by setting the distance between terminals to 100 μm.

(Resistance Value upon Package Inspection)

Figure 2:
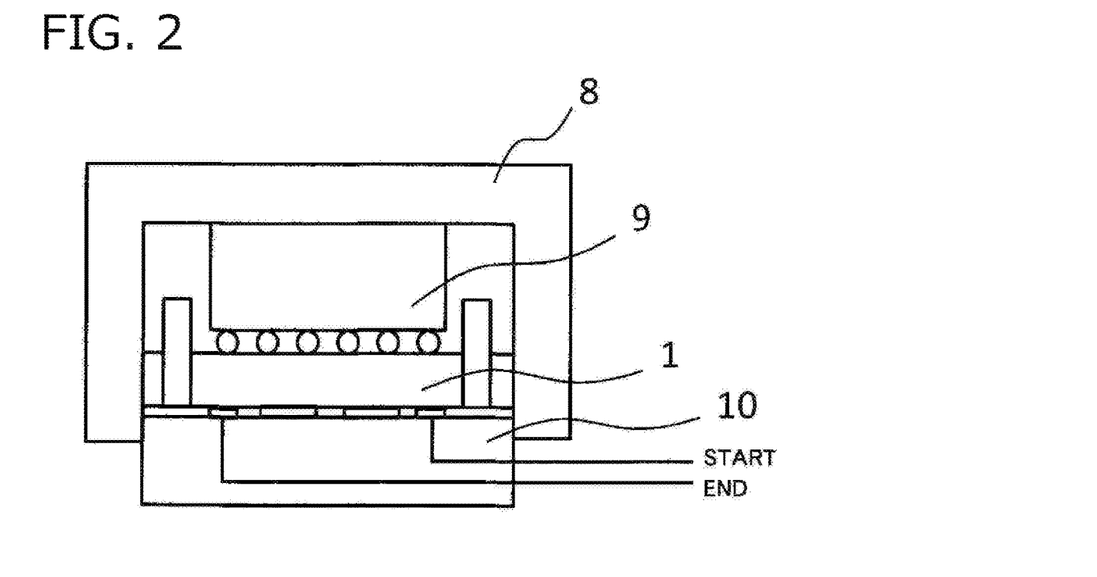
FIG. 2 is a schematic diagram describing a method for a package inspection test related to Examples and Comparative Examples.

The resistance value upon package inspection was obtained using a Ball Grid Array (BGA) package for test (product No: P-LFBGA104, manufactured by DENKEN Co., Ltd, number of pins: 104 pins, size: 7.0×7.0×0.40 mm) and a socket with a test motherboard (product name: socket for P-LFBGA104, manufactured by Japan Manufacturer Trade, Inc.). More particularly, as illustrated in FIG. 2, the anisotropic conductive sheet 1 according to Examples 1 to 10 and Comparative Examples 1 to 3 was interposed between a BGA package for test 9 connected to a socket 8 and a test motherboard 10, the resistance value between the START portion and the END portion was measured with a resistance meter (product No: RM3544, manufactured by HIOKI E.E. CORPORATION, measuring terminal: pin type lead L2103), and the resistance value at the time of incorporating the BGA package for test 9 and the motherboard 10 was measured.

(Package Inspection Test)

During the assembling of a Ball Grid Array (BGA) package for test (product No: P-LFBGA104, manufactured by DENKEN Co., Ltd, number of pins: 104 pins, size: 7.0×7.0×0.40 mm), the wire connection part inside the package was intentionally cut off at one site, and a defective BGA package was produced. A non-defective BGA package in which the wire connection part was not cut off and the above-described defective BGA package were used, and for the anisotropic conductive sheets according to Examples 1 to 10 and Comparative Examples 1 to 3, the possibility of package inspection was tested. An anisotropic conductive sheet was interposed between the non-defective BGA package and a test motherboard of a socket with a test motherboard (product No: socket for P-LFBGA104, manufactured by Japan Manufacturer Trade, Inc.), and it was verified that the resistivity could be measured. Next, in a case in which an anisotropic conductive sheet was interposed between a defective BGA package and a test motherboard, and the resistivity was not measurable (over-range), the BGA package was considered as a non-defective product capable of package inspection and was rated as ○. A BGA package for which the resistivity was measurable (over-range) in both of a case in which an anisotropic conductive sheet was interposed between a non-defective BGA package and a test motherboard, and a case in which an anisotropic conductive sheet was interposed between a defective BGA package and a test motherboard, was considered as a defective product incapable of package inspection and was rated as ×.

TABLE 1

| | | Example 1 | Example 2 | Example 3 | Example 4 | Example 5 | Example 6 |
|---|---|---|---|---|---|---|---|
| Carbon nanotubes | Organic solvent-dispersed carbon nanotubes | 03DS-NP-RD | EC1.5P-NMP | EC2.0P-NMP | EC2.0P-NMP | EC2.0P-NMP | EC1.5P-NMP |
| | Carbon nanotube concentration in organic solvent-dispersed carbon nanotubes (% is mass %) | 0.30% | 0.20% | 0.20% | 0.20% | 0.20% | 0.20% |
| | Organic solvent-dispersed carbon nanotubes (parts by mass) | 177 | 265 | 265 | 375 | 555 | 265 |
| | Carbon nanotubes (parts by mass) | 0.53 | 0.53 | 0.53 | 0.75 | 1.11 | 0.53 |
| | N-methyl-2-pyrrolidone (parts by mass) | 176 | 264 | 264 | 374 | 554 | 264 |
| Binder resin | YD-128 (liquid Bis A type epoxy resin) (parts by mass) | 9 | 9 | 9 | 9 | 9 | |
| | ZX-1059 (hardly crystallizable liquid epoxy resin) (parts by mass) | | | | | | 9 |
| | ZX-1658GS (cyclic aliphatic diglycidyl ether) (parts by mass) | | | | | | |
| | XP1434 (silanol group-containing siloxane) (parts by mass) | | | | | | |
| | FM9915 (silanol group-containing siloxane) (parts by mass) | | | | | | |
| Curing agent | Diethylenetriamine (epoxy resin curing agent) (parts by mass) | 1 | 1 | 1 | 1 | 1 | 1 |
| | S-510 (alkoxysilane) (parts by mass) | | | | | | |

TABLE 1-continued

|  | | | | | | |
|---|---|---|---|---|---|---|
| Total solid content (parts by mass) | 10.5 | 10.5 | 10.5 | 10.8 | 11.1 | 10.5 |
| Packing amount of carbon nanotubes in solid content | 5.0% | 5.0% | 5.0% | 7.0% | 10.0% | 5.0% |
| Sheet processing apparatus | Small-sized heat press | Small-sized heat press | Small-sized heat press | Small-sized heat press | Small-sized heat press | Small-sized heat press |
| Drying conditions | 180° C. (heating on lower side)/ 30 min | 180° C. (heating on lower side)/ 30 min | 180° C. (heating on lower side)/ 30 min | 180° C. (heating on lower side)/ 30 min | 180° C. (heating on lower side)/ 30 min | 180° C. (heating on lower side)/ 30 min |
| Resistance value in thickness direction/Ω | 0.8 | 0.7 | 0.7 | 0.6 | 0.3 | 0.9 |
| Resistance value in planar direction/Ω | 6.5 | 8.5 | 7.0 | 8.0 | 3.0 | 7.5 |
| Resistance value upon package inspection/Ω | 300 | 200 | 200 | 150 | 90 | 320 |
| Package inspection test | ○ | ○ | ○ | ○ | ○ | ○ |

| | | | Example 7 | Example 8 | Example 9 | Example 10 |
|---|---|---|---|---|---|---|
| Carbon nanotubes | Organic solvent-dispersed carbon nanotubes | | EC1.5P-NMP | EC1.5P-NMP | 03DS-NP-RD | EC1.5P-NMP |
| | Carbon nanotube concentration in organic solvent-dispersed carbon nanotubes (% is mass %) | | 0.20% | 0.20% | 0.30% | 0.20% |
| | Organic solvent-dispersed carbon nanotubes (parts by mass) | | 265 | 265 | 500 | 265 |
| | Carbon nanotubes (parts by mass) | | 0.53 | 0.53 | 1.5 | 0.53 |
| | N-methyl-2-pyrrolidone (parts by mass) | | 264 | 264 | 499 | 264 |
| Binder resin | YD-128 (liquid Bis A type epoxy resin) (parts by mass) | | | | 9 | |
| | ZX-1059 (hardly crystallizable liquid epoxy resin) (parts by mass) | | | | | |
| | ZX-1658GS (cyclic aliphatic diglycidyl ether) (parts by mass) | | 9 | | | |
| | XP1434 (silanol group-containing siloxane) (parts by mass) | | | 7 | | |
| | FM9915 (silanol group-containing siloxane) (parts by mass) | | | | | 7 |
| Curing agent | Diethylenetriamine (epoxy resin curing agent) (parts by mass) | | 1 | | 1 | |
| | S-510 (alkoxysilane) (parts by mass) | | | 3 | | 3 |
| Total solid content (parts by mass) | | | 10.5 | 10.5 | 1.5 | 3.5 |
| Packing amount of carbon nanotubes in solid content | | | 5.0% | 5.0% | 13.0% | 5.0% |
| Sheet processing apparatus | | | Small-sized heat press | Small-sized heat press | Small-sized heat press | Small-sized heat press |
| Drying conditions | | | 180° C. (heating on lower side)/ 30 min | 180° C. (heating on lower side)/ 30 min | 180°C (heating on lower side)/ 30 min | 180° C. (heating on lower side)/ 30 min |
| Resistance value in thickness direction/Ω | | | 0.9 | 0.8 | 0.1 | 0.9 |
| Resistance value in planar direction/Ω | | | 8.3 | 5.6 | 2.8 | 7.6 |
| Resistance value upon package inspection/Ω | | | 300 | 300 | 50 | 300 |
| Package inspection test | | | ○ | ○ | ○ | ○ |

TABLE 2

| | | Comparative Example 1 | Comparative Example 2 | Comparative Example 3 |
|---|---|---|---|---|
| Carbon nanotubes | Powder type carbon nanotubes | | | SG101 |
| | Carbon nanotubes (parts by mass) | | | 0.53 |
| | Organic solvent-dispersed carbon nanotubes | 03DS-NP-RD | 03DS-NP-RD | |
| | Carbon nanotube concentration in organic solvent-dispersed carbon nanotubes (% is mass %) | 0.30% | 0.30% | |
| | Organic solvent-dispersed carbon nanotubes (parts by mass) | 177 | 177 | |
| | Carbon nanotubes (parts by mass) | 0.53 | 0.53 | |
| | N-methyl-2-pyrrolidone (parts by mass) | 176 | 176 | |
| Binder resin | YD-128 (liquid Bis Atype epoxy resin) (parts by mass) | 9 | 9 | 9 |
| | ZX-1059 (hardly crystallizable liquid epoxy resin) (parts by mass) | | | |
| | ZX-1658GS (cyclic aliphatic diglycidyl ether) (parts by mass) | | | |
| | XP1434 (silanol group-containing siloxane) (parts by mass) | | | |
| | FM9915 (silanol group-containing siloxane) (parts by mass) | | | |
| Curing agent | Diethylenetriamine (epoxy resin curing agent) (parts by mass) | 1 | 1 | 1 |
| | S-510 (alkoxysilane) (parts by mass) | | | |

TABLE 2-continued

|  | Comparative Example 1 | Comparative Example 2 | Comparative Example 3 |
|---|---|---|---|
| Total solid content (parts by mass) | 10.5 | 10.5 | 10.5 |
| Packing amount of carbon nanotubes in solid content | 5.0% | 5.0% | 5.3% |
| Sheet processing apparatus | Small-sized heat pressing machine | Comma coater | Small-sized heat pressing machine |
| Drying conditions | 180° C. (heating on both upper and lower sides)/30 min | 180° C./30 min | 180° C. (heating on lower side)/30 min |
| Resistance value in thickness direction/Ω | 3.0 | 4.5 | 10 |
| Resistance value in planar direction/Ω | 3.4 | 3.8 | 9.8 |
| Resistance value upon package inspection/Ω | 1200 | 1400 | 3000 |
| Package inspection test | X | X | X |

As shown in Table 1, the anisotropic conductive sheets according to Examples 1 to 10 were produced through a composition casting step of pouring a conductive filler material-containing composition that includes a conductive filler material dispersed in an organic solvent, and a binder resin onto a plate, and molding the composition into a sheet form, and an organic solvent volatilization step of volatilizing the organic solvent by heating the plate. Therefore, satisfactory results were obtained in the package inspection test.

In contrast, as shown in Table 2, the anisotropic conductive sheet according to Comparative Example 1 was heated on both sides in the thickness direction of the conductive filler material-containing composition cast in the composition casting step, and therefore, the conductive filler material was not oriented, while inferior results were obtained in the package inspection test. Furthermore, the anisotropic conductive sheet according to Comparative Example 2 was produced without carrying out the composition casting step and the organic solvent volatilization step according to the present invention, and therefore, the conductive filler material was not oriented, while inferior results were obtained in the package inspection test. In Comparative Example 3, since the conductive filler material was not dispersed in an organic solvent, the conductive filler material was not oriented, and inferior results were obtained in the package inspection test.

EXPLANATIONS OF LETTERS OR NUMERALS

1 ANISOTROPIC CONDUCTIVE SHEET
2 CIRCUIT DEVICE AS OBJECT OF INSPECTION
3 ELECTRODE TO BE INSPECTED
4 CIRCUIT BOARD FOR INSPECTION

The invention claimed is:

1. A method for producing an anisotropic conductive sheet, the method comprising:
   a molding step of molding a conductive filler material-containing composition including (A) a conductive filler material dispersed in an organic solvent and (B) a binder resin, into a sheet-like body; and
   an organic solvent volatilization step of heating one surface of the sheet-like body and thereby volatilizing the organic solvent through the other surface of the sheet-like body, migrating the conductive filler material along a flow in which the organic solvent volatilizes from a heated side to an unheated side, and orienting the conductive filler material in a thickness direction of the sheet-like body,
   wherein the conductive filler material is carbon nanotubes having a G/D band ratio obtained by Raman spectroscopy of 1.0 or higher and an average length of 1.0 μm or more.

2. The method for producing an anisotropic conductive sheet according to claim 1,
   wherein the (B) binder resin is an epoxy resin,
   the (A) conductive filler material dispersed in an organic solvent is carbon nanotubes dispersed in an organic solvent,
   the conductive filler material-containing composition includes the carbon nanotubes dispersed in an organic solvent, the epoxy resin, and an epoxy resin curing agent, and
   the content of the carbon nanotubes is 0.1% to 15% by mass with respect to all the solid components included in the conductive filler material-containing composition.

3. The method for producing an anisotropic conductive sheet according to claim 1, wherein the anisotropic conductive sheet has a resistance value in the thickness direction of 2.0 Ω or less.

4. The method for producing an anisotropic conductive sheet according to claim 1, wherein the anisotropic conductive sheet has a thickness of 1 to 500 μm.

* * * * *